Aug. 9, 1932.  L. F. KENNEDY  1,870,632
TRACTOR
Filed April 11, 1930   4 Sheets-Sheet 4
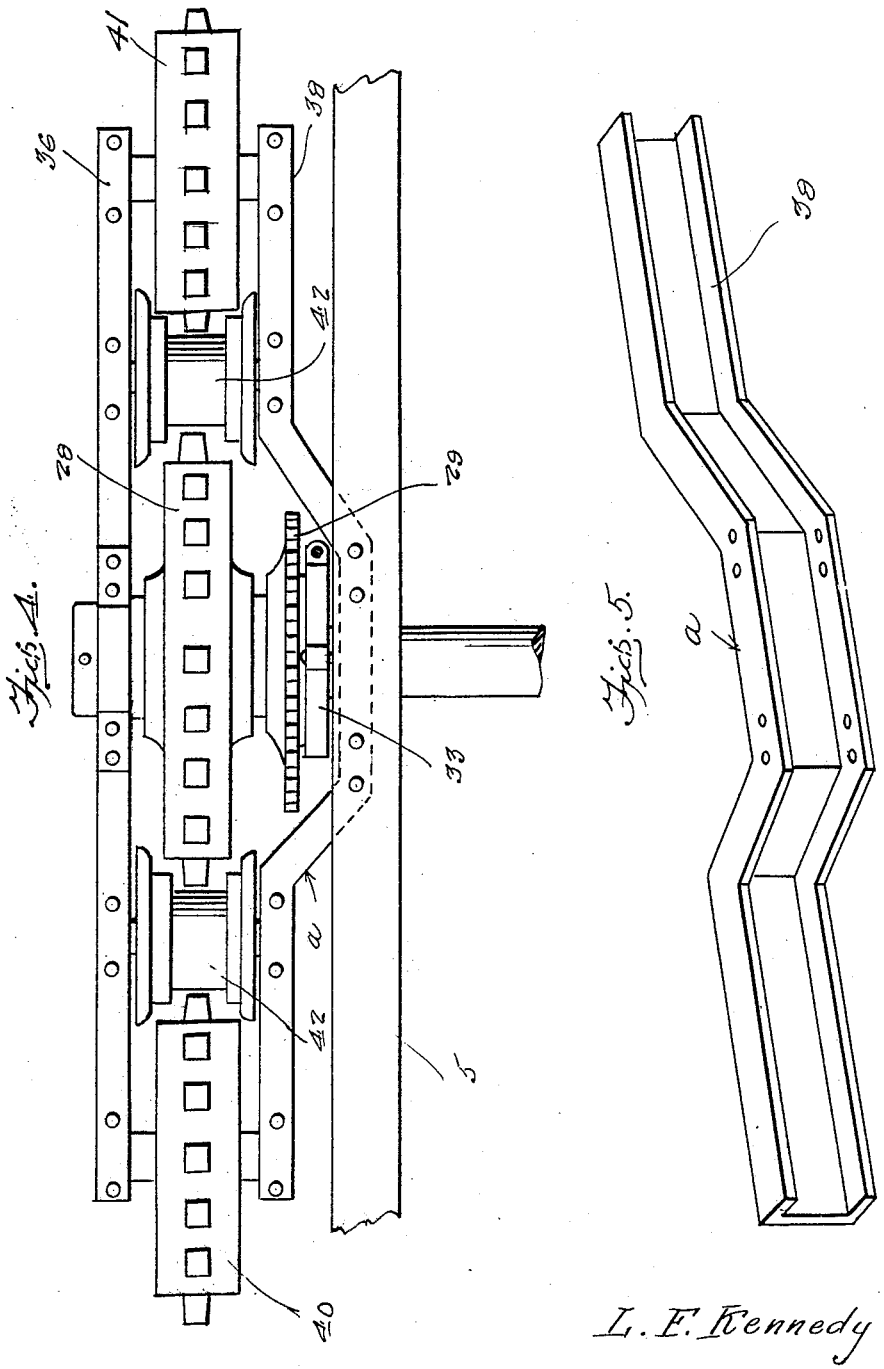

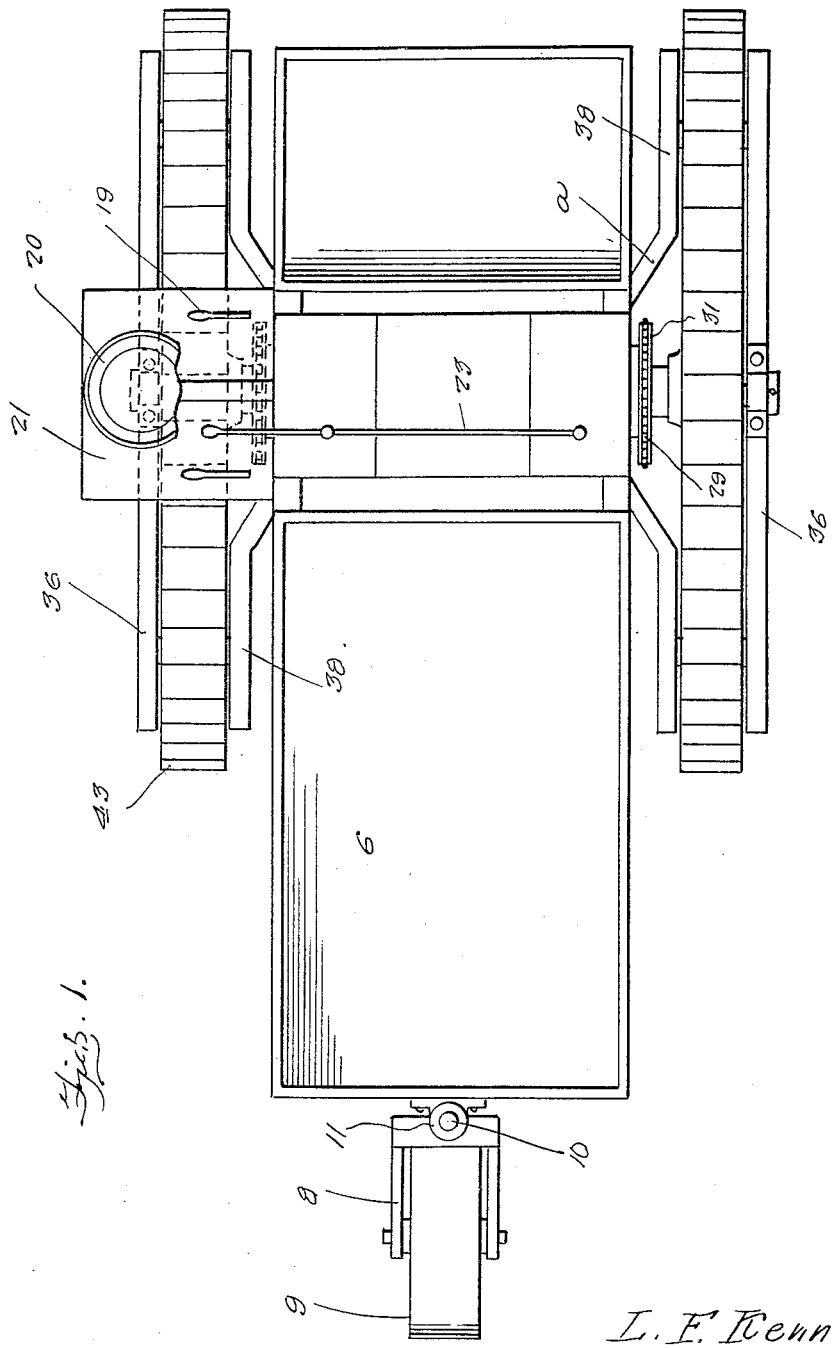

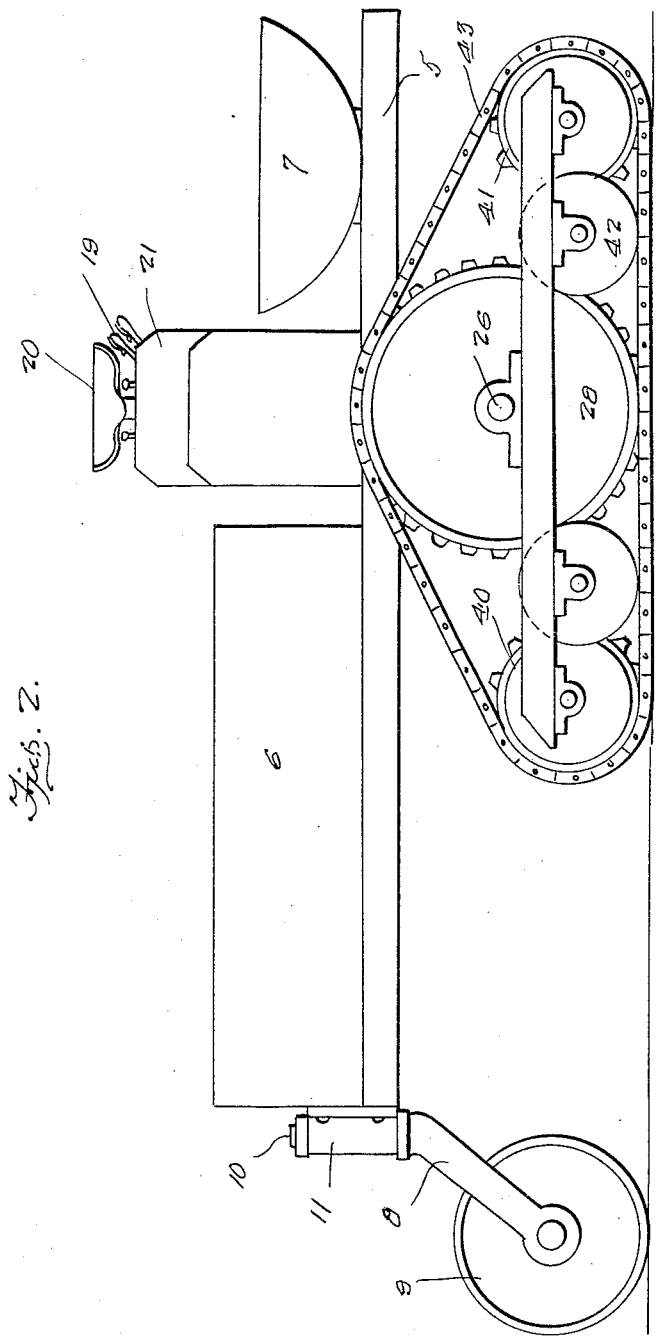

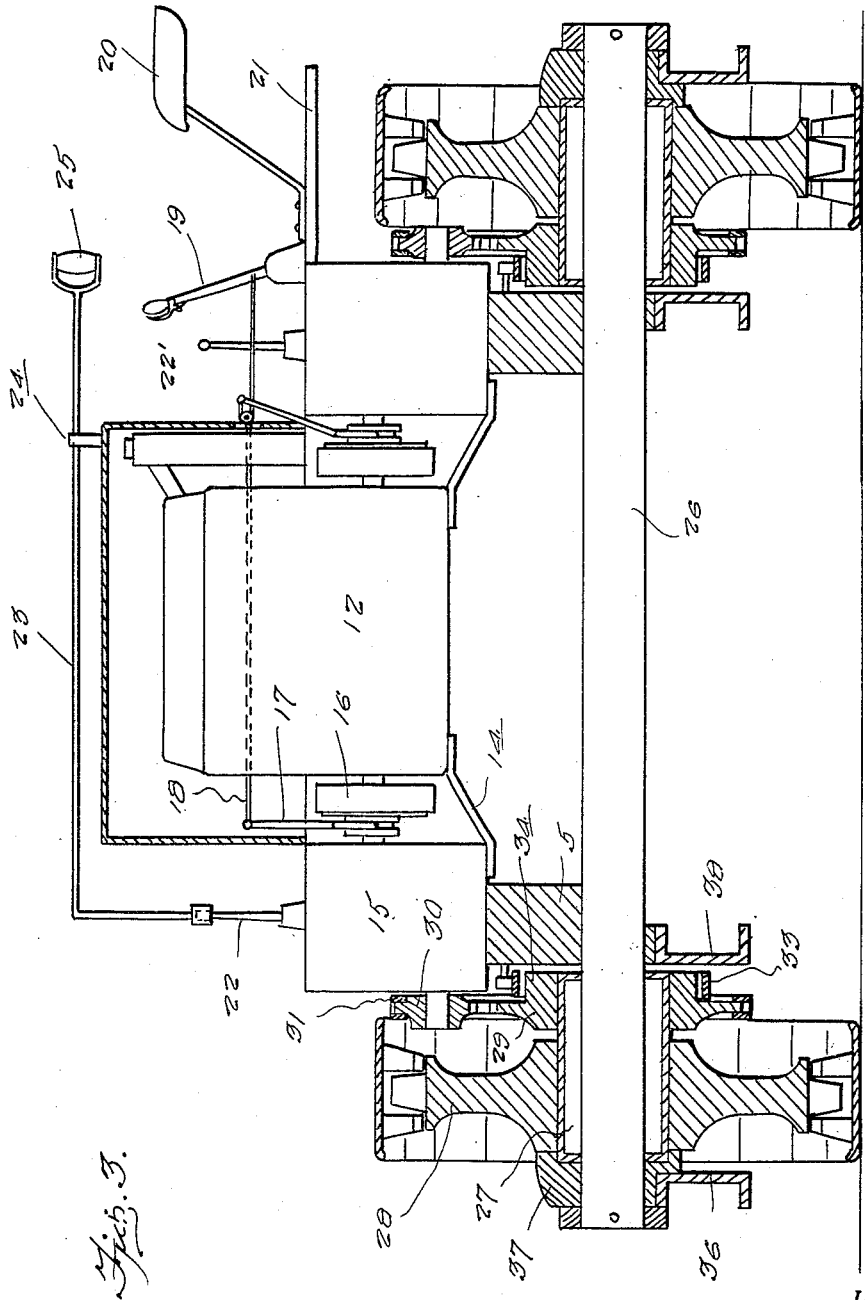

Patented Aug. 9, 1932

1,870,632

UNITED STATES PATENT OFFICE

LOUIS F. KENNEDY, OF MANKATO, MINNESOTA

TRACTOR

Application filed April 11, 1930. Serial No. 443,453.

The present invention relates generally to tractors and the objects and advantages thereof will become apparent from a consideration of the following detail description when taken in conjunction with the accompanying drawings wherein:

Figure 1 is a top plan view of the tractor embodying the features of my invention, Figure 2 is a side elevation thereof, Figure 3 is a vertical transverse section therethrough, Figure 4 is a fragmentary top plan view of one of the driving supports with the endless member removed, and Figure 5 is a perspective view of one of the frame bars.

Referring to the drawings in detail it will be seen that the numeral 5 denotes a main frame on the rear portion of which is mounted a suitable body 6 in any preferred manner and on the front portion a suitable body 7 also mounted in any preferred manner.

The rear end of the frame is supported by a fork 8 with the wheel 9 journaled therein, the fork having a vertical shaft portion 10 rockable in a vertical bearing 11 anchored on the rear of the frame 5.

An engine 12 is supported on the frame between the bodies 5 and 6 by means of brackets 14 extending from transmission structures 15 on the side rails of the frame 5.

The clutches 16 are interposed between the engine 12 and the transmissions 15 and are controlled by levers 17 linked together as at 18 and controllable by a hand lever 19 in reach of an operator on a seat 20 mounted on a platform 21 projecting laterally from one of the transmissions 15.

The transmissions 15 are controlled by gear shift levers 22 and 22'. The lever 22' is in reach of the occupant of the seat 20 while the gear shift lever 22 may be actuated through a link 23 connected to the lever 22 and slidable through bracket 24 on the hood of the engine and terminating in a handle 25 accessible to the occupant of the seat 20.

An axle shaft 26 is mounted under the frame 5 laterally and under the engine 12, clutches 16 and transmission 15 and extends out beyond the sides of the frame. Roller bearing structures 27 are rotatable on the outer ends of the shaft 26 and each has attached thereto a sprocket 28 and a sprocket 29.

Sprockets 30 are oppositely connected with the transmissions 15 and chains 31 are trained over sprockets 30 and 29 for driving the sprocket 28. Brake bands 33 are disposed circumjacent brake drums 34 formed on the inner side of the sprocket 29. The outer frame bars 36 extend longitudinally and at their centers have bearings 37 circumjacent the outer ends of the shaft 26.

Inner frame bars 38 have intermediate offset portions a fixed to depending extensions of the frame 5 through which the shaft 26 extends as is clearly shown in Figure 3. Sprockets 40 and 41 are journaled at the front and rear ends of the frame bars 36 and 38 and idlers 42 are journaled between these bars forwardly and rearwardly of the sprockets 28.

An endless track chain 43 is trained over each sprocket 28 and corresponding sprocket 40, 41 and idlers 42 as is clearly apparent from an inspection of Figure 2.

From the above detailed description it will be readily apparent that the operator sits over one of the driving endless track mechanisms and is in a position to control the endless track mechanisms so as to maneuver the tractor to advantage.

From the foregoing then it will be seen that I have provided an automotive vehicle wherein the internal combustion engine or prime mover for the vehicle is mounted transversely of the vehicle and further that the traction wheel or other means of traction for the vehicle are brought into operative connection with the engine or prime mover at either end of the engine thus permitting the operator of the vehicle to make a quick turn to permit the transferring of power to the sprockets or wheels of the vehicle and that there is employed but a single steering mechanism for the vehicle.

Further it is to be understood that the structure may relate to any type of farm implement or any dumping or other type of vehicle driven from an internal combustion engine or the like.

Having thus described my invention, what I claim as new is:

1. In a tractor, a pair of opposed traction members each including a pair of relatively spaced opposed frame bars, sprockets journalled between the bars at corresponding ends thereof, idlers journalled between the bars inwardly from said ends, an axle shaft supported between the traction members and having the ends thereof supported by the frame bars of said members, a bearing rotatable on each end of the axle shaft, a sprocket on said bearing, traction chains connecting the last named sprockets with the first named sprockets and trained over said idlers, a transmission disposed adjacent each traction member, and a driving connection between each transmission and an adjacent bearing.

2. A tractor including in combination a pair of opposed relatively spaced bars, sprockets journalled between the bars adjacent the ends thereof, an axle shaft having an end supported between said bars intermediate the ends of said bars, a bearing on said end of said axle shaft, a relatively large sprocket on said bearing, idlers journalled between said bars between the sprockets, an endless traction chain trained over all of said sprockets and said idlers, a prime mover, a transmission, clutch means interposed between the transmission and the prime mover, and driving means connecting the transmission with said axle shaft.

In testimony whereof I affix my signature.

LOUIS F. KENNEDY.